United States Patent
Pawlik et al.

(10) Patent No.: US 8,871,862 B2
(45) Date of Patent: Oct. 28, 2014

(54) MOLDING COMPOUND ON THE BASIS OF A COPOLYAMIDE CONTAINING TEREPHTHALIC ACID AND TRIMETHYLHEXAMETHYLENE DIAMINE UNITS

(75) Inventors: Andreas Pawlik, Recklinghausen (DE); Martin Roos, Haltern am See (DE); Franz-Erich Baumann, Duelmen (DE); Harald Haeger, Luedinghausen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/377,949

(22) PCT Filed: Jul. 8, 2010

(86) PCT No.: PCT/EP2010/059809
§ 371 (c)(1),
(2), (4) Date: Dec. 13, 2011

(87) PCT Pub. No.: WO2011/003973
PCT Pub. Date: Jan. 13, 2011

(65) Prior Publication Data
US 2012/0095161 A1    Apr. 19, 2012

(30) Foreign Application Priority Data
Jul. 10, 2009    (DE) .......................... 10 2009 027 611

(51) Int. Cl.
*C08L 77/00*    (2006.01)
*C08G 69/26*    (2006.01)
*C08L 77/06*    (2006.01)

(52) U.S. Cl.
CPC ............... *C08G 69/265* (2013.01); *C08L 77/06* (2013.01)
USPC ............................ 524/607; 528/340; 528/323

(58) Field of Classification Search
None
See application file for complete search history.

(56) References Cited

U.S. PATENT DOCUMENTS

| | | | |
|---|---|---|---|
| 4,145,474 A * | 3/1979 | Kertscher et al. ............. | 428/378 |
| 5,300,557 A * | 4/1994 | Bartmann et al. ............ | 524/606 |
| 2003/0050376 A1 | 3/2003 | Oka et al. | |
| 2008/0119632 A1 | 5/2008 | Baumann et al. | |
| 2008/0166529 A1 | 7/2008 | Hager et al. | |
| 2008/0274355 A1* | 11/2008 | Hewel ........................... | 428/402 |
| 2009/0062452 A1* | 3/2009 | Harder et al. ................. | 524/494 |

FOREIGN PATENT DOCUMENTS

EP    0 423 472    4/1991

OTHER PUBLICATIONS

Dolden, J.G., "Structure-property relationships in amorphous polyamides," Polymer, vol. 17, No. 10, pp. 875-892, (Oct. 1, 1976).
International Search Report Issued Jan. 11, 2011 in PCT/EP10/59809 Filed Jul. 8, 2010.

* cited by examiner

*Primary Examiner* — Susannah Chung
*Assistant Examiner* — Robert T Butcher
(74) *Attorney, Agent, or Firm* — Oblon, Spivak, McClelland, Maier & Neustadt, L.L.P.

(57) ABSTRACT

A molding compound, containing at least 30% by weight of a copolyamide, which is derived from the following monomers: a) 50 to 95 mole percent of the combination of a diamine, selected from the group consisting of 1,9-nonane diamine, 1,10-decane diamine, 1,11-undecane diamine and 1,12-dodecane diamine, and terephthalic acid, and b) 5 to 50 mole percent of the combination of a diamine, selected from the group consisting of 2,2,4-trimethylhexamethylene diamine, 2,4,4-trimethylhexamethylene diamine, and mixtures thereof, and terephthalic acid. The copolyamide is crystalline and has low water absorption.

20 Claims, 1 Drawing Sheet

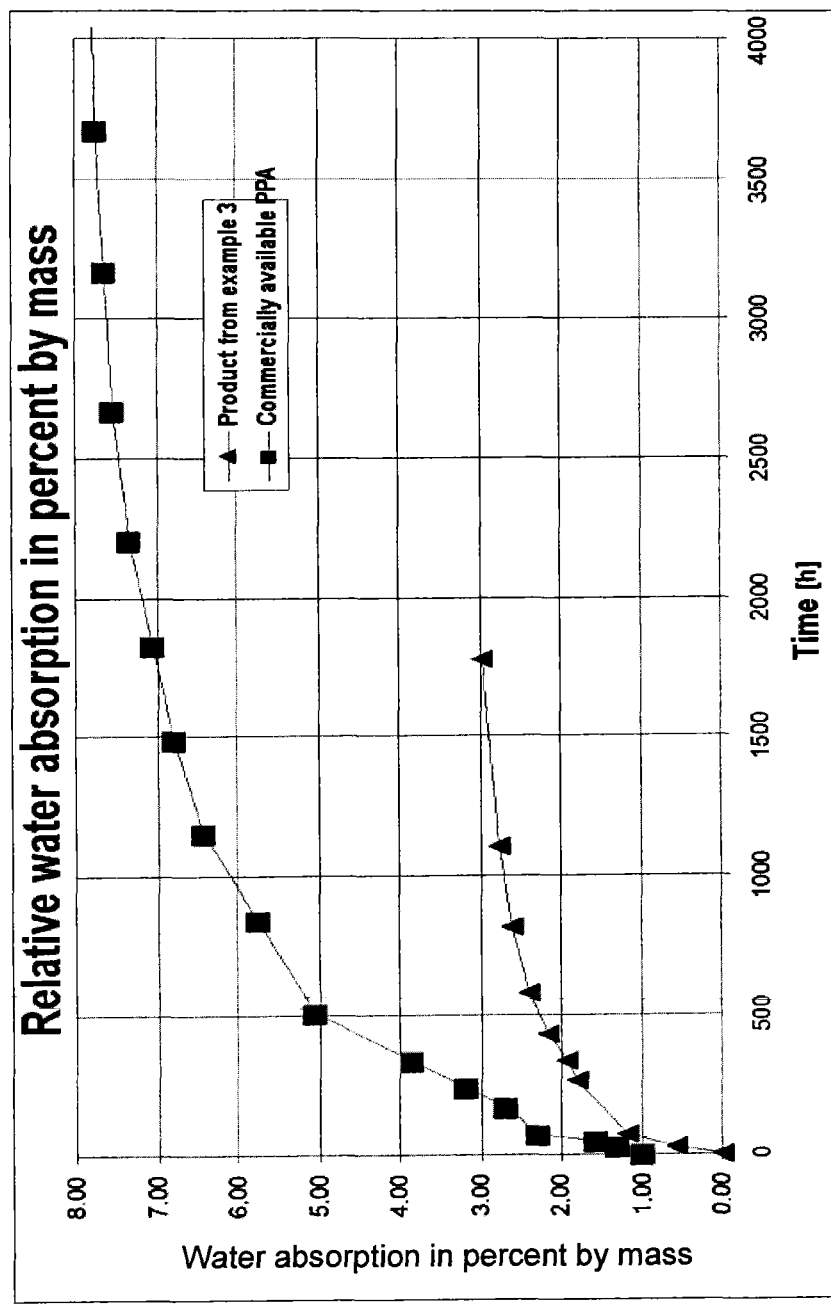

MOLDING COMPOUND ON THE BASIS OF A COPOLYAMIDE CONTAINING TEREPHTHALIC ACID AND TRIMETHYLHEXAMETHYLENE DIAMINE UNITS

The invention relates to molding compositions based on a copolyamide which comprises units which derive from terephthalic acid, from a linear diamine having from 9 to 12 carbon atoms, and also from trimethylhexamethylenediamine (TMD).

Known standard polyamides such as PA6 and PA66 are easy to process and have high melting points and high heat resistance values, in particular when they have been reinforced with glass fibers or comprise mineral fillers. However, they typically have high water absorption values of up to 10% when stored in water. These aliphatic polyamides cannot be used for many applications with stringent requirements placed on dimensional stability which also apply to wet or moist conditions. It is not only dimensions that alter with water absorption but also mechanical properties. Water absorption reduces stiffness and strength to a fraction of their original values. Use of these standard polyamides is therefore problematic in applications involving mechanical load in contact with water or ambient moisture.

Semiaromatic polyamides of PA6T/6I type as described in U.S. Pat. No. 4,607,073 have reduced water absorption in comparison with PA6 and PA66; mechanical properties are substantially retained after water absorption. For precision parts, water absorption is still too high, because of swelling; melting points are likewise too high, and the use of isophthalic acid here severely reduces crystallinity, and also crystallization rate. This leads to problematic processability.

On the other hand, PA10T, as likewise disclosed in U.S. Pat. No. 4,607,073, has greatly reduced water absorption; mechanical properties do not change significantly on storage in water. This is a high-melting-point material, with a crystallite melting point $T_m$ of 316° C.; it is highly crystalline and crystallizes very rapidly, and freezing therefore occurs in the nozzles during the injection-molding process. The surfaces of glass fiber-reinforced PA10T moldings exhibit severe disruption.

The specifications EP 0 659 799 A2, EP 0 976 774 A2, EP 1 186 634 A1, and EP 1 375 578 A1 describe semiaromatic polyamides made of from 60 to 100 mol % of terephthalic acid and from 60 to 100 mol % of a diamine component made of 1,9-nonanediamine and 2-methyl-1,8-octanediamine. These products feature good processability, excellent crystallinity, good heat resistance values, low water absorption, and good chemicals resistance, dimensional stability, and toughness. However, 2-methyl-1,8-octanediamine is not currently approved in Europe because it is not covered by the regulations applying to either new substances or to existing substances. This is a hindrance to rapid product introduction in the European market.

The applicant markets TROGAMID® T5000, a polyamide composed of terephthalic acid and of a mixture of 2,2,4-TMD and 2,4,4-TMD. This polyamide features high mechanical strength and high toughness. However, the bulky diamine component makes the material amorphous and therefore demonstrates only limited chemicals resistance, apparent in stress cracking in particular in the presence of polar organic solvents. Dimensional stability on heating is also restricted by the lack of crystalline content; maximum water absorption is relatively high: about 7.5%. Although the replacement of linear aliphatic diamines by bulky monomers such as TMD in polyamides generally leads to increased glass transition temperatures, there is a simultaneous drastic reduction of crystallinity.

U.S. Pat. No. 4,495,328 describes semicrystalline polyamides made of terephthalic acid and mixtures of hexamethylenediamine and TMD. That document gives PA6T/TMDT (60/40 in mol %) as an example, with a melting point of 310° C. U.S. Pat. No. 4,476,280 describes copolyamides made of terephthalic acid, isophthalic acid, and adipic acid, in combination with hexamethylenediamine and TMD.

U.S. Pat. No. 4,617,342 also describes corresponding systems. In none of these specifications are there any statements relating to dimensional stability on contact with water or on mechanical properties or chemicals resistance in the conditioned state.

EP 1 988 113 A1 describes a polyamide molding composition based on a 10T/6T copolyamide, formed from the monomers 1,10-decanediamine, 1,6-hexanediamine and terephthalic acid. However, the concomitant use of 1,6-hexanediamine does not sufficiently lower the high melting point of PA10T.

It is an object of the invention to provide polyamide molding compositions which have good processability and which feature melting points in the range from about 250° C. to about 300° C., more preferably up to about 290° C., with sufficiently high crystallinity combined with minimum differences in mechanical properties, heat resistance values, and dimensional stability in the freshly injection-molded state and also in the moisture-conditioned state.

This object is achieved via a molding composition which comprises at least 30% by weight, preferably at least 40% by weight, particularly preferably at least 50% by weight, and with particular preference at least 60% by weight, of a copolyamide which derives from the following monomers:
a) to an extent of from 50 to 95 mol %, preferably from 55 to 90 mol %, and particularly preferably from 60 to 85 mol %, from the combination of a diamine selected from the group of 1,9-nonanediamine, 1,10-decanediamine, 1,11-undecanediamine and 1,12-dodecanediamine with terephthalic acid, and
b) to an extent of from 5 to 50 mol %, preferably from 10 to 45 mol %, and particularly preferably from 15 to 40 mol %, from the combination of a diamine selected from the group of 2,2,4-trimethylhexamethylenediamine (2,2,4-TMD), 2,4,4-trimethylhexamethylenediamine (2,2,4-TMD) and mixtures thereof with terephthalic acid, where the stated mol % values are based on the entirety of components a) and b).

In one preferred embodiment, the copolyamide comprises no units which derive from other monomers. In other embodiments, the copolyamide comprises at most 30 mol %, at most 25 mol %, at most 20 mol %, at most 15 mol %, at most 10 mol %, or at most 5 mol %, of units which derive from other monomers. A point to be noted here in calculation of the constitution is that in this instance diamine and dicarboxylic acid are in each case counted individually, as also are any lactam present and any amino carboxylic acid present.

There can also be from 0 to 70% by weight of additives present, preferably from 0 to 60% by weight, particularly preferably from 0 to 50% by weight, and with particular preference from 0.1 to 40% by weight, based on the molding composition. Accordingly, the molding composition can be composed of the pure copolyamide.

The units which derive from other monomers can be categorized as follows:

Firstly they can derive from the combination of a diamine and a dicarboxylic acid. A distinction can be drawn between the following cases here:
a) The dicarboxylic acid is terephthalic acid; the diamine is a diamine other than the diamines of the claims, which are 1,9-nonanediamine, 1,10-decanediamine, 1,11-undecanediamine, 1,12-decanediamine, 2,2,4-TMD, and 2,4,4-TMD.
b) The dicarboxylic acid is an acid other than terephthalic acid; the diamine is one of the diamines of the claims, as stated immediately above.
c) Not only is the dicarboxylic acid an acid other than terephthalic acid, but the diamine is a diamine other than the diamines of the claims, as stated immediately above.

Secondly they can derive from a lactam or an aminocarboxylic acid.

Examples of suitable other diamines are diamines having from 4 to 22 carbon atoms, e.g. 1,4-butanediamine, 1,5-pentanediamine, 1,6-hexanediamine, 1,8-octanediamine, 1,14-tetradecanediamine, 1,18-octadecanediamine, 2-methyl-1,5-diaminopentane, 2,2-dimethyl-1,5-diaminopentane, 4,4'-diaminodicyclohexylmethane, 3,3'-dimethyl-4,4'-diaminodicyclohexylmethane, 3,3',5,5'-tetramethyl-4,4'-diaminodicyclohexylmethane, m- or p-xylylenediamine, and isophoronediamine.

Examples of suitable other dicarboxylic acids are dicarboxylic acids having from 6 to 22 carbon atoms, e.g. adipic acid, suberic acid, azelaic acid, sebacic acid, undecanedioic acid, dodecanedioic acid, tridecanedioic acid, tetradecanedioic acid, hexadecanedioic acid, octadecanedioic acid, 2,2,4- and 2,4,4-trimethylhexanedioic acid, isophthalic acid, 2,6-naphthalenedicarboxylic acid, 1,4-cyclohexanedicarboxylic acid, and 2-methyl-1,4-cyclohexanedicarboxylic acid.

Examples of suitable lactams or aminocarboxylic acids are caprolactam, laurolactam, and ω-aminoundecanoic acid.

It is also possible here to use mixtures of other diamines, mixtures of other dicarboxylic acids, mixtures of lactams and/or aminocarboxylic acids, and also mixtures of other diamine and/or other dicarboxylic acid and lactam and/or aminocarboxylic acid.

The copolyamide is generally produced via the polycondensation in the melt. Corresponding processes are prior art. However, it is also possible, as an alternative to this, to use any other known polyamide synthesis process.

Examples of suitable additives in the molding composition are:
a) other polymers;
b) fibrous reinforcing materials;
c) fillers;
d) plasticizers;
e) pigments and/or dyes;
f) flame retardants;
g) processing aids, and
h) stabilizers.

Examples of other polymers are polyamides, polyphenylene ethers and/or impact modifiers.

Examples of suitable polyamides are PA46, PA66, PA68, PA610, PA612, PA613, PA410, PA412, PA810, PA1010, PA1012, PA1013, PA1014, PA1018, PA1212, PA6, PA11, and PA12, and also copolyamides which derive from these types. It is also possible in principle to use semicrystalline aromatic polyamides, such as PA6T/6I, PA6T/66, PA6T/6, or PA6T/6I/66.

Suitable polyphenylene ethers are produced by conventional processes via oxidative coupling from phenols disubstituted in ortho-position by alkyl groups. A particularly preferred polyphenylene ether is poly(2,6-dimethyl-1,4-phenylene)ether, optionally in combination with 2,3,6-trimethylphenol units. In the prior art, the polyphenylene ether comprises functional groups for linkage to the polyamide matrix; these functional groups are introduced by way of example via maleic anhydride treatment.

Examples of suitable impact modifiers are olefinic polymers which comprise functional groups which either have been grafted onto the olefinic main chain or have been copolymerized into the main chain; suitable types and combinations are disclosed by way of example in EP 1 170 334 A2. It is moreover also possible to use polyacrylate rubber or ionomers.

The amount of other polymers comprised in the molding composition is preferably at most 40% by weight, particularly preferably at most 30% by weight, and with particular preference at most 25% by weight.

Examples of suitable fibrous reinforcing materials are glass fibers, carbon fibers, aramid fibers, stainless steel fibers, and potassium titanate whiskers.

Examples of suitable fillers are talc powder, mica, silicate, quartz, graphite, molybdenum disulfide, titanium dioxide, wollastonite, kaolin, amorphous silicates, magnesium carbonate, chalk, lime, feldspar, barium sulfate, conductive carbon black, graphite fibrils, solid or hollow glass beads, and ground glass.

Plasticizers and their use in polyamides are known. A general overview of plasticizers suitable for polyamides can be found in Gächter/Müller, Kunststoffadditive [Plastics additives], C. Hanser Verlag, 2nd edition, p. 296.

Examples of conventional compounds suitable as plasticizers are esters of p-hydroxybenzoic acid having from 2 to 20 carbon atoms in the alcohol component, and amides of arylsulfonic acids having from 2 to 12 carbon atoms in the amine component, preferably amides of benzenesulfonic acid.

The following, inter alia, can be used as plasticizers: ethyl p-hydroxybenzoate, octyl p-hydroxybenzoate, isohexadecyl p-hydroxybenzoate, N-n-octyltoluenesulfonamide, N-n-butylbenzenesulfonamide, and N-2-ethylhexylbenzenesulfonamide.

Examples of suitable pigments and/or dyes are carbon black, iron oxide, zinc sulfide, ultramarine, nigrosin, pearl-luster pigments, and metal flakes.

Examples of suitable flame retardants are antimony trioxide, hexabromocyclododecane, tetrabromobisphenol, borates, red phosphorus, magnesium hydroxide, aluminum hydroxide, melamine cyanurate and its condensates, e.g. melam, melem, and melon, melamine compounds such as melamine pyrophosphate and melamine polyphosphate, ammonium polyphosphate, and also organophosphorus compounds and salts of these, for example resorcinol diphenyl phosphate, phosphonic esters, and metal phosphinates.

Examples of suitable processing aids are paraffins, fatty alcohols, fatty acid amides, paraffin waxes, montanates, and polysiloxanes.

Examples of suitable stabilizers are copper salts, molybdenum salts, copper complexes, phosphites, sterically hindered phenols, secondary amines, UV absorbers, and HALS stabilizers.

The molding composition of the invention can be processed by way of example via injection molding, extrusion, or blowing molding, to give moldings. Typical examples of applications in the injection-molding sector are connectors and housings for the automobile or electrical industry, and also fittings, filter cups, and housings for drinking-water applications. In the extrusion section, mention may be made of pipes and also single- and multilayer foils by way of example. Molding compositions of this type can also be used to manufacture powders for composites, for example using glass fibers or using carbon fibers. Finally, mention may be made of charge-air pipes in automobiles as an example of blow-molded parts.

The polyamide molding composition of the invention has excellent suitability for the production of monofilaments (individual fibers) and also of multifilaments (e.g. yarns with in each case 100 individual fibers). The melt temperature here varies as a function of process and usage viscosity of the molding composition, from about 280° C. to about 340° C. Typical drawing temperatures are in the range from about 160° C. to about 180° C. The filaments can by way of example be used for textiles, or as reinforcing fibers in composites, for example together with a thermoset matrix, or as bristles.

Powders made of the molding composition of the invention can by way of example be produced via milling, via precipitation, or by any of the other known processes. The powder can be used by way of example for layer-by-layer shaping processes (rapid prototyping), for surface coating, or for producing fiber composite materials (composites). The $d_{90}$ grain size of the powder is generally at most 500 μm, preferably at most 400 μm, particularly preferably at most 300 μm, and with particular preference at most 200 μm, determined by means of laser scattering to ISO 13320:2009.

Fiber composite materials are composed of reinforcing fibers and of a plastics matrix. The fibers have been bonded adhesively or cohesively to the matrix, which completely surrounds them. The orientation of the reinforcing fibers gives fiber-plastics composites anisotropic mechanical properties. They generally have high specific stiffness and strength values. They are therefore suitable materials for lightweight construction applications. Fiber composite materials are predominantly used to produce sheet-like structures.

The fibers used in the present case can be of inorganic type (e.g. glass fibers or basalt fibers) or of organic type (e.g. aramid fibers or carbon fibers). It is also possible to use mixtures of various fibers. Fiber composite materials can by way of example be produced via impregnation of sheet-like fiber structures with powder made of the molding composition of the claims, and hot pressing; the resultant composites can be sheet-like or three-dimensional. Sheet-like composites can then be thermoformed.

Two processes are mainly used for the impregnation of the fiber structure with powder:
  impregnation by way of a suspension, where the polymer in the form of a fine powder suspended in a liquid is brought into contact with the fibers, or
  impregnation by way of the powder scattering process.

It is moreover also possible by way of example to produce fiber composite materials made of the molding composition of the claims via melt impregnation of the reinforcing fibers or via pressing of polymer foils with the reinforcing fibers (film stacking).

When the composite is produced starting from powder, it is also possible in principle that the powder made of the molding composition of the invention is used together with other thermoplastics powders, and another particular possibility is combination with starting materials for thermoset matrix materials (e.g. powder together with the components of two-component epoxy resins). The powder acts as component increasing impact resistance in fiber-reinforced systems of this type, and also in unreinforced systems, together with a thermoset matrix or else a thermoplastic matrix (for example bismaleimide resin).

Examples are used below to illustrate the invention.

An example of a suitable apparatus for producing the higher-melting-point types of the copolyamide of the invention is the apparatus shown in FIG. 2 of U.S. Pat. No. 2,361,717. For adaptation to the laboratory scale, items 23, 24, and 25 in that figure can be replaced by a high-pressure autoclave which can use inert gas blanketing to provide a constant pressure for conveying through the reactors. In the subsequent examples, the first tubular reactor (corresponding to item 26) had a length of 6 m and an internal diameter of 1.4 mm, and the second tubular reactor (corresponding to item 27') had a length of 10 m and an internal diameter of 2 mm. Both reactors were operated with an initial oil temperature of 360° C.

INVENTIVE EXAMPLE 1

CoPA 10T/TMDT (80:20)

The following were charged within the autoclave: 675.2 g of 1,10-decanediamine (98.6 percent purity), 150.3 g of a mixture of 2,2,4- and 2,4,4-TMD, 789.3 g of terephthalic acid, 452 g of deionized water, 3.1 g of a heat stabilizer, and 2.88 g of a 5 percent strength aqueous $H_3PO_2$ solution, the system was inertized three times with nitrogen, and the autoclave was sealed and heated, using an initial oil temperature of 230° C. A clear, homogeneous salt solution formed here. Nitrogen was used to adjust the autoclave to a constant total pressure of 44 bar; this pressure conveyed the material through the system. 16.5 g/h of polymer were produced in the flasher (item 30). The results of analysis were:
  Terminal carboxy group content: 113 mmol/kg
  Terminal amino group content: 106 mmol/kg
  Relative solution viscosity $\eta_{rel}$, measured to ISO 307 in 0.5% by weight solution in m-cresol at 23° C.: 1.59
  $T_g$ (to ISO 11357): 126° C.
  $T_{m1}$ (to ISO 11357): 256° C. (measured during the 2nd heating procedure)
  $T_{m2}$ (to iso 11357): 278° C. (main peak; measured during the 2nd heating procedure)

The product was solid-phase post-condensed at 180° C. in a slow stream of nitrogen for 30 h to give a material with $\eta_{rel}$=1.79.

INVENTIVE EXAMPLE 2

CoPA 10T/TMDT (94:6)

The following were charged within the autoclave: 654.9 g of 1,10-decanediamine (98.6 percent purity), 38.0 g of a mixture of 2,2,4- and 2,4,4-TMD, 664.6 g of terephthalic acid, 372.5 g of deionized water, 1.2 g of sodium hypophosphite, 2.4 g of a heat stabilizer, and 1.2 g of a 5 percent strength $H_3PO_2$ solution, the system was inertized three times with nitrogen, and the autoclave was sealed and heated, using an initial oil temperature of 230° C. A clear, homogeneous salt solution formed here. Nitrogen was used to adjust the autoclave to a constant total pressure of 42 bar; this pressure conveyed the material through the system. 17.9 g/h of polymer were produced in the flasher. The results of analysis were:
  Terminal carboxy group content: 172 mmol/kg
  Terminal amino group content: 167 mmol/kg
  $\eta_{rel}$ 1.42
  $T_g$: 122° C.
  $T_m$: 297° C. (main peak)

The product was solid-phase postcondensed at 180° C. in a slow stream of nitrogen for 40 h to give a material with $\eta_{rel}$=1.74.

INVENTIVE EXAMPLE 3

The further copolyamide listed in the tables below was produced as in inventive example 1, with a decanediamine/TMD ratio of 85:15.

REFERENCE EXAMPLE 1

The homopolymer PA10T was produced as in inventive example 1.

INVENTIVE EXAMPLE 4

The following starting materials were charged to a 30 l stirred autoclave for production of a CoPA 10T/TMDT (70:30):
  3.962 kg of 1,10-decanediamine (in the form of 99.3% aqueous solution),
  1.549 kg of 2,2,4- and 2,4,4-trimethylhexamethylenediamine isomer mixture,
  5.563 kg of terephthalic acid, and also
  1.12 g of a 50% aqueous solution of hypophosphorous acid (corresponding to 0.006% by weight) with
  5.96 kg of deionized water.

The starting materials were melted under nitrogen and heated to about 220° C. in the sealed autoclave, with stirring, the resultant internal pressure being about 20 bar. Said internal pressure was maintained for 2 hours; the melt was then further heated to 305° C., with continuous depressurization to atmospheric pressure, and was then kept at this temperature in the stream of nitrogen for 1.5 hours. The system was then depressurized to atmospheric pressure within 3 hours and nitrogen was passed over the melt for a further 3 hours until the torque indicated no further rise in melt viscosity. The melt was then discharged by means of a gear pump and strand-pelletized. The pellets were dried at 110° C. under nitrogen for 24 hours.
  Yield: 7.4 kg
  The properties of the product were as follows:
  Crystallite melting point $T_m$: 270° C.
  Relative solution viscosity $\eta_{rel}$: 1.76
  Terminal COOH groups: 291 mmol/kg
  Terminal $NH_2$ groups: 17 mmol/kg

INVENTIVE EXAMPLE 5

The following starting materials were charged to a 30 l stirred autoclave for production of a CoPA 12T/TMDT (60:40):
  3.788 kg of 1,12-dodecanediamine (in the form of 99.4% aqueous solution),
  1.982 kg of 2,2,4- and 2,4,4-trimethylhexamethylenediamine isomer mixture,
  5.305 kg of terephthalic acid, and also
  1.13 g of a 50% aqueous solution of hypophosphorous acid (corresponding to 0.006% by weight) with
  5.96 kg of deionized water.

The starting materials were melted under nitrogen and heated to about 220° C. in the sealed autoclave, with stirring, the resultant internal pressure being about 20 bar. Said internal pressure was maintained for 2 hours; the melt was then further heated to 295° C., with continuous depressurization to atmospheric pressure, and was then kept at this temperature in the stream of nitrogen for 1.5 hours. The system was then depressurized to atmospheric pressure within 3 hours and nitrogen was passed over the melt for a further 3 hours until the torque indicated no further rise in melt viscosity. The melt was then discharged by means of a gear pump and strand-pelletized. The pellets were dried at 110° C. under nitrogen for 24 hours.
  Yield: 8.9 kg
  The properties of the product were as follows:
  Crystallite melting point $T_m$: 232° C.
  Relative solution viscosity $\eta_{rel}$: 1.53
  Terminal COOH groups: 275 mmol/kg
  Terminal $NH_2$ groups: 84 mmol/kg

INVENTIVE EXAMPLE 6

The following starting materials were charged to a 30 l stirred autoclave for production of a CoPA 12T/TMDT (70:30):
  4.356 kg of 1,12-dodecanediamine (in the form of 99.4% aqueous solution),
  1.465 kg of 2,2,4- and 2,4,4-trimethylhexamethylenediamine isomer mixture,
  5.258 kg of terephthalic acid, and also
  1.13 g of a 50% aqueous solution of hypophosphorous acid (corresponding to 0.006% by weight) with
  5.97 kg of deionized water.

The starting materials were melted under nitrogen and heated to about 220° C. in the sealed autoclave, with stirring, the resultant internal pressure being about 20 bar. Said internal pressure was maintained for 2 hours; the melt was then further heated to 295° C., with continuous depressurization to atmospheric pressure, and was then kept at this temperature in the stream of nitrogen for 1.5 hours. The system was then depressurized to atmospheric pressure within 3 hours and nitrogen was passed over the melt for a further 3 hours until the torque indicated no further rise in melt viscosity. The melt was then discharged by means of a gear pump and strand-pelletized. The pellets were dried at 110° C. under nitrogen for 24 hours.
  Yield: 9.1 kg
  The properties of the product were as follows:
  Crystallite melting point $T_m$: 257° C.
  Relative solution viscosity $\eta_{rel}$: 1.56
  Terminal COOH groups: 269 mmol/kg
  Terminal $NH_2$ groups: 17 mmol/kg

INVENTIVE EXAMPLE 7

A copolyamide with a dodecanediamine/TMD ratio of 75:25 was produced as in inventive example 6.

INVENTIVE EXAMPLES 8 AND 9

Two copolyamides with a decanediamine/TMD ratio of 60:40 and, respectively, 52:48 were produced as in inventive example 4.

COMPARATIVE EXAMPLES 1 AND 2

Two copolyamides with a decanediamine/TMD ratio of 33:67 and, respectively, 12:88 were produced as in inventive example 4.

The tables below give the properties of the resultant polyamides and copolyamides.

TABLE 1

Calorimetric data for copolyamides 10T/TMDT, determined to ISO 11357 during the 2nd heating procedure

| Co-PA10T/TMDT | Reference 1 | Inv. example 2 | Inv. example 3 | Inv. example 1 | Inv. example 4 | Inv. example 8 | Inv. example 9 | Comp. example 1 | Comp. example 2 |
|---|---|---|---|---|---|---|---|---|---|
| Proportion of 10 [mol %] | 100 | 94 | 85 | 80 | 70 | 60 | 52 | 33 | 12 |
| Proportion of TMD [mol %] | 0 | 6 | 15 | 20 | 30 | 40 | 48 | 67 | 88 |
| Enthalpy of fusion [J/g] | 64 | 62 | 62 | 52 | 49 | 45 | 17 | 0 | 0 |
| $T_m$ [° C.] | 309 | 297 | 282 | 274 | 270 | 263 | 251 | — | — |
| $T_g$ [° C.] | 119 | 122 | 123 | 125 | 128 | 133 | 134 | 137 | 145 |

TABLE 2

Calorimetric data for copolyamides 12T/TMDT, determined to ISO 11357 during the 2nd heating procedure

| Co-PA12T/TMDT | Inv. example 7 | Inv. example 6 | Inv. example 5 |
|---|---|---|---|
| Proportion of 12 [mol %] | 75 | 70 | 60 |
| Proportion of TMD [mol %] | 25 | 30 | 40 |
| Enthalpy of fusion [J/g] | 51 | 52 | 38 |
| $T_m$ [° C.] | 263 | 258 | 247 |
| $T_g$ [° C.] | 116 | 116 | 118 |

FIG. 1 compares the relative water absorption of the product from inventive example 3 (storage in full contact at 23° C.) with that of a commercially available PPA produced from 1,6-hexamethylenediamine and a dicarboxylic acid mixture of 65 mol % of terephthalic acid, 25 mol % of isophthalic acid, and 10 mol % of adipic acid. The water absorption of the copolyamide of the invention is seen to be considerably lower.

Table 3 shows that the product from inventive example 3 in essence retains its mechanical properties after exposure to moist conditions (in this case: storage in full contact in an autoclave at 120° C.). The increase in modulus of elasticity in the first case is attributable to recrystallization.

TABLE 3

Mechanical properties in the dry state and after exposure to moist conditions

| Product from inventive example 3 | Storage period [h] | Modulus of elasticity to ISO 527 [MPa] | Tensile stress at break to ISO 527 [MPa] | Tensile strain at break to ISO 527 [MPa] |
|---|---|---|---|---|
| Without additives | 0 | 2594 | 81 | 5 |
|  | 100 | 2819 | 80 | 6 |
| With 30% by weight of glass fibers | 0 | 8702 | 273 | 3 |
|  | 24 | 8404 | 269 | 3 |

Production of Powder:

The product from inventive example 8, in the form of strand-pelletized material with length about 5 mm and diameter about 3 mm was milled in a pinned-disk mill (Alpine CW 160). The ingoing pellets were cooled to −50° C. by means of a cooling screw, accelerated to speeds up to 220 m/s within the grinding chamber, and abraded between the pins of the counter-rotating grinder disks. This gave a ground product with 50% by weight content of grain diameter smaller than 100 µm, with throughput 15 kg/h. The ground product was sieved at 63 µm; the grain size distribution of the resultant fines was $d_{10}$=14.9 µm, $d_{50}$=43.7 µm and $d_{90}$=75.4 µm (determined by laser scattering).

This fine powder was used for production of fiber composite materials.

What is claimed is:

1. A molding composition comprising at least 30% by weight, based on the weight of the composition, of a copolyamide, the copolyamide comprising, in reacted form
    a) 50 to 95 mol % of a first mixture consisting of terephthalic acid and one diamine selected from the group consisting of 1,9-nonanediamine, 1,10-decanediamine, 1,11-undecanediamine and 1,12-dodecanediamine, and
    b) 5 to 50 mol % of a second mixture consisting of terephthalic acid and at least one diamine selected from the group consisting of 2,2,4-trimethylhexamethylenediamine and 2,4,4-trimethylhexamethylenediamine,
    where the mol % values are based on the entirety of components a) and b), and at most 5 mol % of units which derive from one or more other monomers selected from the group consisting of an acid other than terephthalic acid, a lactam and an aminocarboxylic acid.

2. The composition of claim 1, consisting of the copolyamide.

3. The composition of claim 1, further comprising at least 0.1% by weight, based on the weight of the composition, of one or more additives.

4. The composition of claim 1, wherein the composition is a powder.

5. A molding comprising the molding composition of claim 1.

6. A foil comprising the molding composition of claim 1.

7. A filament comprising the molding composition of claim 1.

8. A fiber composite material comprising the molding composition of claim 1.

9. The composition of claim 1, comprising at least 40% by weight of the copolyamide, based on the weight of the composition.

10. The composition of claim 1, comprising at least 50% by weight of the copolyamide, based on the weight of the composition.

11. The composition of claim 1, comprising at least 60% by weight of the copolyamide, based on the weight of the composition.

12. The composition of claim 1, wherein the copolyamide comprises, in reacted form, 55 to 90% of component (a), and 10 to 45% of the second mixture, based on the entirety of components a) and b).

13. The composition of claim 1, wherein the copolyamide comprises, in reacted form, 60 to 85% of the first mixture, and 15 to 40% of mixture component (a), based on the entirety of components a) and b).

14. The molding composition of claim 1, wherein the copolyamide comprises, in reacted form, the monomers of the first mixture in an amount of 85-95 mol %.

15. A molding composition comprising at least 30% by weight, based on the weight of the composition, of a copolyamide, the copolyamide comprising, in reacted form in a 1:1 molar ratio of diamine:terephthalic acid, wherein
  a) 50 to 60 mol % of a first diamine is selected from the group consisting of 1,9-nonanediamine, 1,10-decanediamine, 1,11-undecanediamine and 1,12-dodecanediamine, and
  b) 40 to 50 mol % of a second diamine is selected from the group consisting of 2,2,4-trimethylhexamethylenediamine and 2,4,4-trimethylhexamethylenediamine,
  where the mol % values are based on the entirety of the terephthalic acid and the components a) and b) and at most 5 mol % of one or more other monomers, wherein the molding composition does not comprise 4,4'-diaminodicyclohexylaminemethane.

16. The molding composition of claim 1, having a melting point of from 251° C. to 282° C.

17. The molding composition of claim 1, having an enthalphy of fusion of from 52 to 64 J/g.

18. A molding composition comprising at least 30% by weight, based on the weight of the composition, of a copolyamide, the copolyamide comprising, in reacted form
  a) 50 to 95 mol % of a first mixture consisting of terephthalic acid and one diamine selected from the group consisting of 1,9-nonanediamine, 1,10-decanediamine, 1,11-undecanediamine and 1,12-dodecanediamine, and
  b) 5 to 50 mol % of a second mixture consisting of terephthalic acid and at least one diamine selected from the group consisting of 2,2,4-trimethylhexamethylenediamine and 2,4,4-trimethylhexamethylenediamine,
  where the mol % values are based on the entirety of components a) and b), and at most 5 mol % of one or more other monomers selected from the group consisting of an acid other than terephthalic acid, a lactam and an aminocarboxylic acid
  wherein the copolyamide has a melting temperature of from 250 to 290° C. and an enthalpy of fusion of 52 to 62 J/g.

19. A molding composition comprising at least 30% by weight, based on the weight of the composition, of a copolyamide, the copolyamide comprising, in reacted form in a 1:1 molar ratio of to diamine:terephthalic acid, wherein
  a) 50 to 60 mol % of a first diamine is selected from the group consisting of 1,9-nonanediamine, 1,10-decanediamine, 1,11-undecanediamine and 1,12-dodecanediamine, and
  b) 40 to 50 mol % of a second diamine is selected from the group consisting of 2,2,4-trimethylhexamethylenediamine and 2,4,4-trimethylhexamethylenediamine,
  where the mol % values are based on the entirety of the terephthalic acid and the components a) and b), and at most 5 mol % of one or more other monomers, wherein the molding composition does not comprise 4,4'-diaminodicyclohexylaminemethane,
  wherein the copolyamide has a melting temperature of from 250 to 290° C. and an enthalpy of fusion of 52 to 62 J/g.

20. The molding composition of claim 18, wherein a proportion of trimethylhexamethylenediamine monomer units in the copolyamide is within the range of 6-15 mol %.

* * * * *